United States Patent
Mittapalli et al.

(10) Patent No.: US 8,245,022 B2
(45) Date of Patent: Aug. 14, 2012

(54) METHOD AND SYSTEM TO SUPPORT ISCSI BOOT THROUGH MANAGEMENT CONTROLLERS

(75) Inventors: Balaji Mittapalli, Austin, TX (US); RadhaKrishna Reddy Dasari, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 925 days.

(21) Appl. No.: 11/756,944

(22) Filed: Jun. 1, 2007

(65) Prior Publication Data

US 2008/0301425 A1 Dec. 4, 2008

(51) Int. Cl.
*G06F 9/00* (2006.01)
*G06F 15/177* (2006.01)

(52) U.S. Cl. .......................................................... 713/2
(58) Field of Classification Search ........................ 713/2
See application file for complete search history.

(56) References Cited

U.S. PATENT DOCUMENTS

| | | | |
|---|---|---|---|
| 7,363,356 B1 * | 4/2008 | Rissmeyer et al. | 709/220 |
| 7,577,707 B2 * | 8/2009 | Hufferd et al. | 709/206 |
| 2005/0080891 A1 * | 4/2005 | Cauthron | 709/223 |
| 2005/0097271 A1 | 5/2005 | Davies et al. | 711/114 |
| 2007/0005816 A1 * | 1/2007 | Diamant et al. | 710/2 |
| 2007/0055853 A1 | 3/2007 | Hatasaki et al. | 713/1 |
| 2007/0067466 A1 | 3/2007 | Gallant et al. | 709/229 |
| 2007/0143583 A1 * | 6/2007 | Cors et al. | 713/1 |
| 2007/0143611 A1 * | 6/2007 | Arroyo et al. | 713/171 |

* cited by examiner

*Primary Examiner* — Mohammed Rehman
(74) *Attorney, Agent, or Firm* — Baker Botts L.L.P.

(57) ABSTRACT

An information handling system includes a host including a central processing unit, a management controller enabled to communicate with the host, a network interface resource in communication with the host and operable to enable the information handling system to communicate via an external network, and a target system in communication with the host through the network interface resource. The management controller comprises an iSCSI initiator operable to generate a request to the target system for an initial OS image.

17 Claims, 1 Drawing Sheet

METHOD AND SYSTEM TO SUPPORT ISCSI BOOT THROUGH MANAGEMENT CONTROLLERS

TECHNICAL FIELD

The present invention is related to information handling systems and, more particularly, the support of iSCSI boot processes through management controllers.

BACKGROUND OF THE INVENTION

As the value and use of information continues to increase, individuals and businesses seek additional ways to process and store information. One option for processing and stored information is an information handling system. An information handling system generally processes, compiles, stores, and/or communicates information or data for business, personal, educational, governmental, or other purposes thereby allowing users to take advantage of the value of the information.

Because technology and information handling needs and requirements vary between different users and/or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is commonly referred to as a server or server system. As suggested by its name, a server system might be described as an information handling system that provides a service to one or more other information handling systems. Server systems include, as examples, application servers dedicated to running specified software applications, database servers that provide database services, file servers that provide file services, web servers that communicate with HTTP (Hypertext transfer protocol) clients to receive and respond to HTTP requests, and numerous other types of servers.

An increasingly important aspect or feature of a server system is its system management resources including remote management resources. Although system management concepts are not exclusively applicable to server systems, they are particularly prevalent in such systems. System management may be differentiated by whether the management is local or remote.

For purposes of this disclosure, local management generally refers to management commands, messages, and the like that are generated by a central processing unit of a server and sent to a management controller.

Remote management, as suggested by its name, refers generally to a management paradigm in which management commands, messages, and the like are generated and transmitted by a remote information handling system, i.e., an information handling system having processing and storage resource that are distinct from the processing and storage resources of the managed system. The remote management system and the managed system are also generally located in different locations.

Conventional implementations of local system management typically implement dedicated interfaces that may include drivers, hardware, and firmware. Small Computer System Interface (SCSI) is a set of standards for physically connecting and transferring data between computers and peripheral devices.

In contrast, remote management typically employs a conventional Ethernet-based IP interface, which is typically provided by a network controller (e.g., a conventional network interface card or NIC). In such remote management implementations, the NIC provides a direct path between the external network to which the remote resource is connected and the management controller embedded in the managed system, i.e., a path from the remote resource to the management controller that does not include the system bus of the managed system. Internet Small Computer System Interface (ISCSI) is a protocol that permits, for example, a user to remotely access SCSI devices. iSCSI may be used to facilitate data transfers over an intranet and/or to manage storage over IP networks. iSCSI-based storage area networks (SAN) have become a growing alternative to fibre-channel based SANs.

Typical iSCSI protocol uses a client-server architecture. The client may include an iSCSI initiator operable to initiate requests and the server may include an iSCSI target operable to respond to the requests. In most examples, iSCSI protocol requires an iSCSI initiator running in the local memory of the client. The iSCSI initiator may be stored on a local storage device or loaded to the local memory using an iSCSI boot process. The iSCSI initiator may connect to the iSCSI target and present itself as a bootable device to a boot monitor running on the client system. If a user boots to the ISCSI target through the iSCSI initiator, a boot monitor associated with the client (or host) will transfer an operating system (OS) loader from the iSCSI target into the local client system memory. Once the OS loader is received from the iSCSI target, the boot monitor will turn over control to the OS loader running in the local client system memory. Finally, the OS loader will access the remaining portion of the OS from the iSCSI target.

In some known systems, the iSCSI initiator may be loaded onto a client system using an iSCSI boot feature provided by a LAN on motherboard (LOM) device. Use of a LOM to support iSCSI boot may require additional firmware called iSCSI firmware which may include an iSCSI initiator protocol stack. Providing iSCSI firmware to a system may increase required flash memory. In some cases, iSCSI firmware may require customizing to specific types of LOM and/or server configurations. Such customization may include firmware development and/or extensive testing. In some cases, previously deployed systems may not support installation of later developed firmware.

SUMMARY OF THE INVENTION

The present disclosure describes an information handling system and method for supporting an iSCSI boot process through management controllers associated with a client system (or host) without using a LOM.

In one embodiment, the present disclosure provides a method to support an iSCSI boot process including using a local management controller to access an initial OS image from an iSCSI target, loading the initial OS image into a local host memory, initiating the initial OS kernel in the local host memory, and using an ISCSI initiator in the local host memory to access a second OS image from the iSCSI target.

In another embodiment, the present disclosure provides an information handling system including a host, a management controller, a network interface resource, and a target system. The host includes a central processing unit. The management controller may be enabled to communicate with the host. The network interface resource may be in communication with the host and operable to enable the information handling system to communicate via an external network. The target system may be in communication with the host through the network interface resource. The management controller may comprise an iSCSI initiator operable to generate a request to the target system for an initial OS image.

In another embodiment, the present disclosure provides a computer program product comprising computer executable instructions, stored on a computer readable medium, for supporting an iSCSI boot process. The computer program product may include instructions for identifying an iSCSI target as a virtual ISCSI in a list of boot devices, instructions for initiating a request to the iSCSI target for an initial OS image, instructions for loading the initial OS image into a host memory, instructions for transferring control from a local boot monitor to the initial OS image, and instructions for loading a second OS image into the host memory.

Embodiments of the present disclosure may include a various technical advantages. One technical advantage of certain embodiments is the ability to support iSCSI boot through management controllers rather than through a LOM. Additional advantages may be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
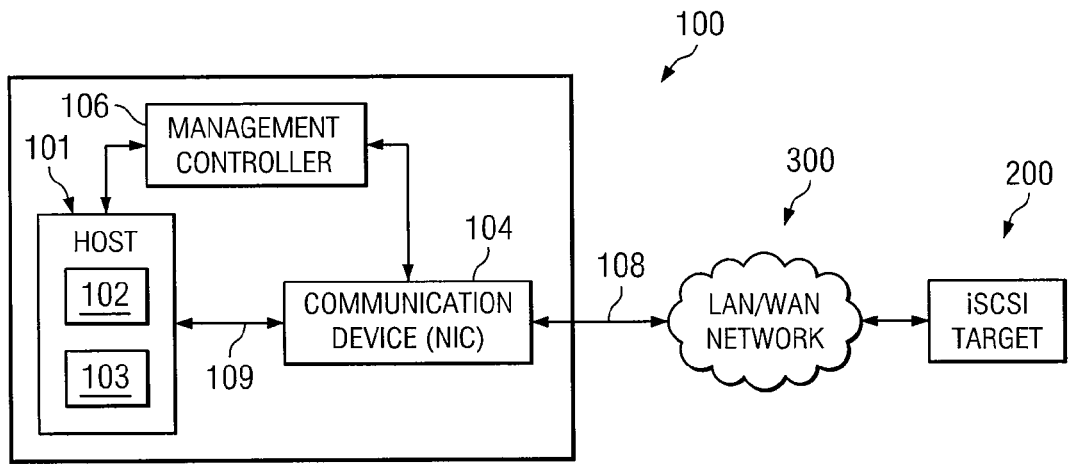
FIG. 1 shows selected elements of an information handling system which may be used in accordance with teachings of the present disclosure.
Figure 2:
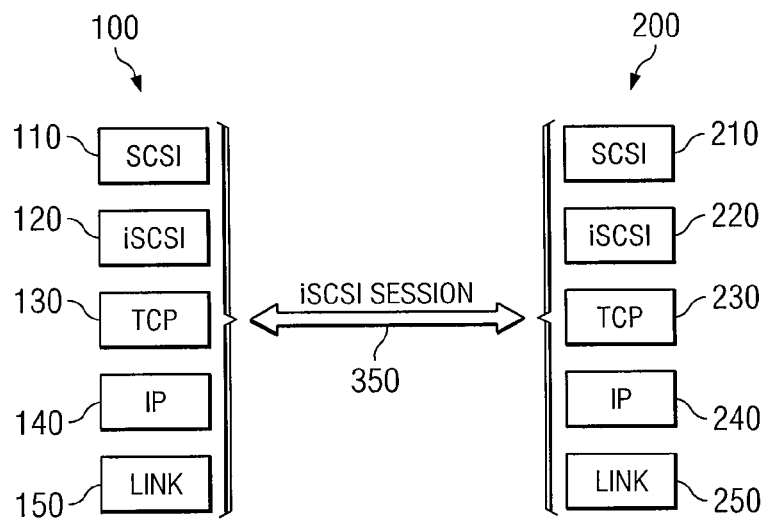
FIG. 2 depicts selected elements of an iSCSI architecture which may be included in an iSCSI session in accordance with teachings of the present disclosure.
Figure 3:
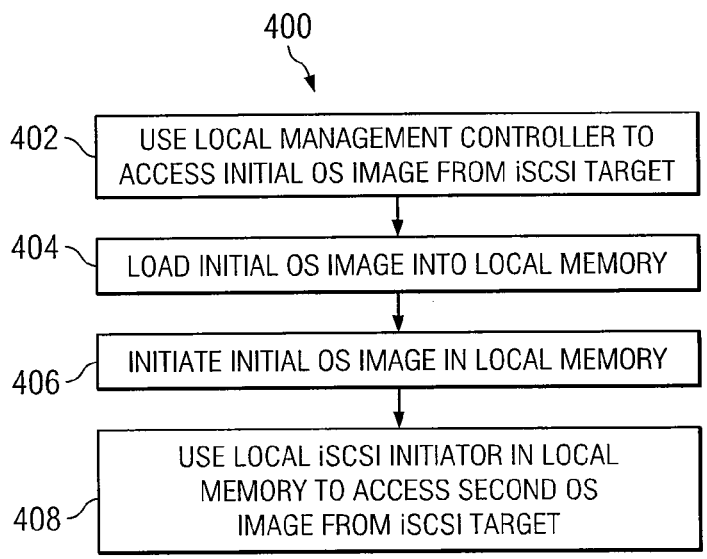
FIG. 3 depicts a flow diagram illustrating selected elements of a method of supporting an iSCSI boot process through management controllers in an information handling system in accordance with teachings of the present disclosure.

Preferred embodiments of the invention and its advantages are best understood by reference to FIGS. 1-3 wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The exemplary implementations of system management resources presented herein may emphasize system management resources in the context of server systems; it should be understood, however, that the system management features described herein may also be appropriate for other classes of information handling systems including, as examples, desktop systems, mobile systems including notebook or lap top systems and hand held systems.

FIG. 1 depicts selected elements of an information handling system 100, an iSCSI target 200, and a LAN/WAN network 300. In the depicted embodiment, information handling system 100 includes a host 101, a network controller 104, and a management controller 106.

Host 101 may include processing resources, e.g., one or more central processing units (CPUs) and storage resources 103 that are accessible to the processing resources. Storage resources may include volatile storage or memory and/or persistent storage, e.g., disk storage, flash memory or other type of erasable read only memory (ROM), and the like. Host 101 may also include various other peripheral or I/O devices known in the field of data processing system design.

In some embodiments, host 101 may include a boot monitor 102. Boot monitor 102 may alternatively be known as a boot loader, boot ROM, and/or a basic input/output system (BIOS). Boot monitor 102 may include firmware or software code that is initiated when host 101 is powered up, whether by a user, automatically, and/or in response to any other signal. Boot monitor 102 may function to initialize peripherals related to host 101. For example, boot monitor 102 may initialize and or all of the following items: a clock generator, processors and caches, a chipset including memory and an input/output controller, system memory, PCI devices, a primary graphics controller, mass storage controllers, input/output controllers (e.g., those associated with a keyboard and/or a mouse), and/or a boot loader for an operating system (OS).

Network controller 104 may enable host 101 to communicate with external resources via a network 300. In some implementations, network controller 104 may include a management filter and/or interface specific firmware modules.

Network 300 may be a local area network (LAN), a wide area network (e.g., the Internet), or a combination thereof, or any other type of communications network including any type of wireless, wireline, and/or other communication links. As depicted in FIG. 1, a network connection 108 connects network 300 to network controller 104. Network connection 108 may include an industry standard network connection such as an Ethernet connection, for example, but other types of network connections (e.g., token ring or ATM) and network connection medium (e.g., wireless) may also be used.

In some embodiments, network controller 104 is referred to as a LAN on motherboard (LOM) because it is embedded in a motherboard of host 101. In other embodiments, network controller 104 may include a network adapter card, commonly referred to as a Network Interface Card (NIC) that is attached to a peripheral or expansion slot in a motherboard. In some implementations, network controller 104 may communicate with host 101 via an industry standard peripheral bus 109. For example, peripheral bus 109 may include a PCI Express (PCI-E) bus.

Information Handling System 100 as shown in FIG. 1 may include a management controller 106. In some embodiments, management controller 106 may include a baseboard management controller (BMC), a remote access card (RAC), an integrated memory controller (IMC), and/or a console management controller (CMC). In some embodiments, a RAC is an interface card that may have its own processor, memory, battery, network connection, and access to the system bus. A RAC may include design features of commercially distributed remote access cards, e.g., the Dell Remote Access Control (DRAC) from Dell, Inc. The DRAC may support or enable remote power management, virtual media access, and/or a remote console, which may be accessible through a supported web browser. For example, the DRAC may enable administrators to configure a system as if they were sitting at the local terminal. As another example, the DRAC may enable administrators to mount remotely shared disk images as if they were connected directly to host 101.

It should be emphasized that the implementation of information handling system 100 as described above is merely exemplary, particularly with regard to the description of specific types of management controllers and specific types of interfaces and protocols. Other management controllers, interfaces, and protocols may be used in lieu of those described herein. For example, an NC-SI interface may be used. NC-SI is an emerging DTMF standard for a NIC-sideband interface suitable for MII or reduced MII implementations.

iSCSI target 200 may include any remote resource which may be appropriately accessed by iSCSI protocol. For example, iSCSI target 200 may include storage resources (e.g., volatile storage or memory and/or persistent storage). iSCSI target 200 may be connected to external network 300 by any appropriate network connection, for example, an Ethernet connection.

FIG. 2 depicts selected elements of an iSCSI architecture which may be included in an iSCSI session 350 for use in accordance with the teachings of the present disclosure. During iSCSI session 350, information handling system 100 may access and/or load stacks, drivers, and/or other programs from an iSCSI target 200 via network 300 discussed above regarding FIG. 1.

In the embodiment shown in FIG. 2, information handling system 100 may use SCSI stack 110, iSCSI stack 120, TCP stack 130, IP stack 140, and/or Link stack 150. In some embodiments, one or more stacks may be present on management controller 106 local to information handling system 100. In some embodiments, one or more stacks may be accessed and/or loaded by information handling system 100 from iSCSI target 200.

For example, management controller 106 may include built-in TCP stack 130, IP stack 140, hardware, and/or a network driver. In some embodiments, management controller 106 may run and/or execute a Linux based system that may include built-in iSCSI stack 120, TCP stack 130, IP stack 140. Management controller 106 may be used, in such embodiments, to access and/or load an initial OS image from iSCSI target 200.

The initial OS image may include an OS kernel, boot drivers, and/or any appropriate boot components configured to start the boot process and/or acquire additional boot files. In embodiments where the initial OS image includes an OS kernel, an iSCSI initiator may load the initial OS image into memory 103 of information handling system 100. The OS kernel may include an iSCSI initiator of its own. Once the OS kernel is initiated in memory 103 of information handling system 100, the OS kernel may use its own iSCSI initiator to access iSCSI target 200 and access and/or load a second OS image. The second OS image may include any portion of the OS not included in the first OS image. For example, if management controller 106 includes iSCSI stack 120, TCP stack 130, IP stack 140, and Link stack 150 the second OS image may include SCSI stack 210, and/or any other requested stacks not associated with management controller 106.

As described above, some embodiments may be implemented as a set of computer executable instructions (software) for supporting an iSCSI boot process using management controllers. The instructions are stored on a computer readable medium such as a storage resource local to host 101 or management controller 106.

FIG. 3 depicts a flow diagram illustrating selected elements of a method 400 of supporting an iSCSI boot process through management controllers in an information handling system. In the depicted embodiment, method 400 may include using local management controller 106 to access an initial OS image from iSCSI target 200 (step 402). Management controller 106 may have been previously configured with information related to ISCSI target 200 and/or an option to enable and/or disable iSCSI operation.

In such embodiments, management controller 106 may run an iSCSI initiator operable to connect to iSCSI target 200. If iSCSI operation has been enabled, a boot monitor associated with host 101 may show iSCSI target 200 as a virtual iSCSI in a list of boot devices available to host 101. If virtual iSCSI is selected, the boot monitor may attempt to boot to management controller 106. Management controller 106 may use an associated iSCSI initiator to generate a request to iSCSI target 200. The request may include an initial OS image. In some embodiments, the initial OS image may include an OS kernel, boot time drivers, and/or any appropriate boot components configured to start the boot process and/or acquire remaining boot files.

Method 400 may include loading an initial OS image into memory 103 associated with host 101 (step 404). As discussed above, the initial OS image may include an OS kernel and boot time drivers.

Method 400 may include initiating the initial OS image in the local memory associated with host 101 (step 406). Step 406 may include the boot monitor transferring control to the initial OS image now initiated in memory 103.

Method 400 may include using an iSCSI initiator in the local host memory to access a second OS image from iSCSI target 200 (step 408). The first OS image initiated at step 406 may include an associated iSCSI initiator operable to access the second OS image. In such embodiments, the first OS image may provide access to the boot disk and any remaining portions of the OS stack associated with iSCSI target 200.

Use of systems and/or methods in accordance with teachings of the present disclosure may provide advantages when compared to solutions which support iSCSI boot processes in a LOM. For example, methods of supporting an iSCSI boot process using a local management controller may provide a single solution operable across a wide variety of servers. As another example, methods using a local management controller rather than a LOM may result in reduced testing effort. As another example, such methods may reduce the cost of hardware and/or software development.

Although the disclosed embodiments have been described in detail, it should be understood that various changes, substitutions and alterations can be made to the embodiments without departing from their spirit and scope.

What is claimed is:

1. A method to support an Internet Small Computer System Interface (iSCSI) boot process comprising:
in an information handling system including a host having a system processor, a boot monitor, and a local memory, and a management controller in communication with the host, the management controller receiving user input for configuring the management controller with remote iSCSI target information such that the management controller is configured to be booted to by the boot monitor based on the remote iSCSI target information;
listing the remote iSCSI target as a virtual iSCSI in a list of boot devices in the boot monitor;
in response to a request by the boot monitor to boot to the management controller, the management controller accessing from a remote iSCSI target a first operating system (OS) image including an iSCSI initiator based on the remote iSCSI target information;
the management controller loading the accessed first OS image into the local memory;
the boot monitor initiating the first OS image in the local memory; and
the iSCSI initiator in the first OS image accessing a second OS image from the remote iSCSI target.

2. The method of claim 1 further comprising offering a user option to enable/disable iSCSI.

3. The method of claim 1 wherein using the management controller to access a first OS image from the remote iSCSI target includes using an iSCSI initiator associated with the management controller to connect to the remote iSCSI target.

4. The method of claim 3 wherein the iSCSI initiator associated with the management controller uses Dynamic Host Configuration Protocol (DHCP).

5. The method of claim 1 wherein using the management controller to access a first OS image from a remote iSCSI target includes generating a request to the remote iSCSI target for the first OS image.

6. The method of claim 1 wherein the first OS image comprises an OS kernel and one or more boot time drivers.

7. The method of claim 1 wherein the boot monitor transfers control to the first OS image running in the local memory.

8. The method of claim 1 wherein the iSCSI initiator in the first OS image loads the second OS image from the remote iSCSI target.

9. An information handling system comprising:
a host including a system processor, a boot monitor, and a local memory;
a management controller in communication with the host; and
a network interface resource in communication with the host, the network interface resource enabling the information handling system to communicate with a remote target system via a network;
wherein the management controller comprises a first Internet Small Computer System Interface (iSCSI) initiator configured to:
receive user input for configuring the management controller with remote iSCSI target information such that the management controller is configured to be booted to by the boot monitor based on the remote iSCSI target information, the boot monitor including the remote iSCSI target in a list of boot devices; and
in response to a request by the boot monitor to boot to the management controller, generate, based on the remote iSCSI information, a request to obtain a first operating system (OS) image from the remote target system via the external network such that the boot monitor may initiate the first OS image in the local memory;
wherein the first OS image comprises a second iSCSI initiator configured to generate a request to obtain a second OS image from the remote target system via the network.

10. The information handling system of claim 9 wherein the first OS image includes an OS kernel and at least one second boot monitor.

11. The information handling system of claim 9 wherein the first OS image further comprises at least one second boot monitor configured to initiate the second OS image in the local memory.

12. The information handling system of claim 9 wherein the first iSCSI initiator uses Dynamic Host Configuration Protocol (DHCP).

13. The information handling system of claim 9 wherein the second iSCSI initiator uses DHCP.

14. The information handling system of claim 9 further comprising the boot monitor operable to initiate the first OS image, the first OS image operable to take control from the boot monitor.

15. A computer program product comprising computer executable instructions, stored on a tangible computer readable medium, for supporting an Internet Small Computer System Interface (iSCSI) boot process on an information handling system, the instructions comprising:
instructions for receiving user input for configuring a management controller with remote iSCSI target information such that the management controller is configured to be booted to by a boot monitor associated with the information handling system based on the remote iSCSI target information;
instructions for identifying an iSCSI target as a virtual iSCSI in a list of boot devices based on the remote iSCSI target information;
in response to a request by the boot monitor to boot to the management controller, instructions for initiating a request to the iSCSI target for a first operating system (OS) image, the first OS image including an iSCSI initiator;
instructions for loading the first OS image into a local memory by the management controller independent from a system processor of the information handling system;
instructions for transferring control from a local boot monitor to the iSCSI initiator of the first OS image for initiating a request to the iSCSI target for a second OS image; and
instructions for loading the second OS image into the local memory.

16. The computer program of claim 15 further comprising instructions for allowing a user to enable/disable iSCSI.

17. The computer program of claim 15 further comprising instructions for connecting to the iSCSI target.

* * * * *